Patented Oct. 16, 1951

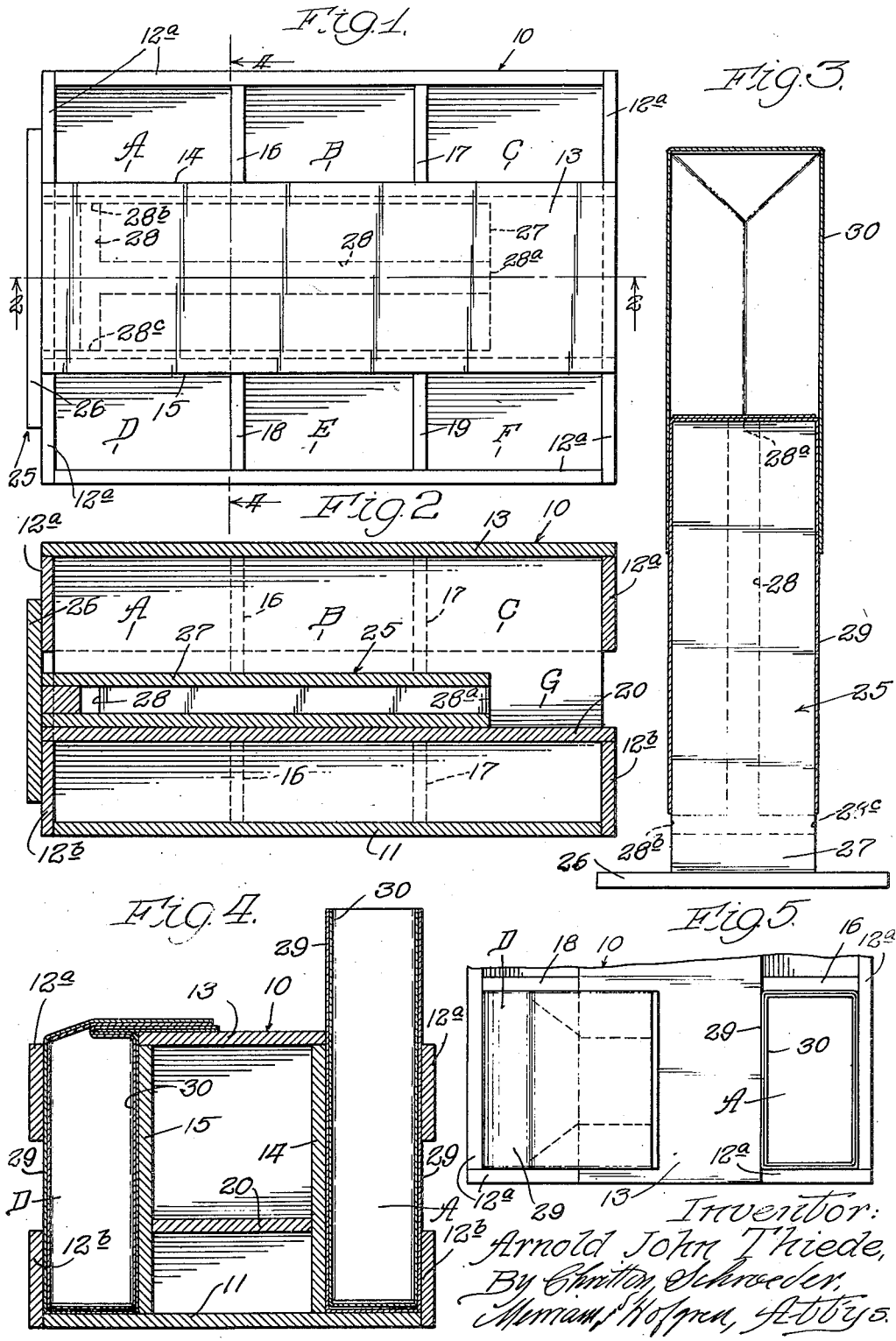

2,571,630

UNITED STATES PATENT OFFICE 2,571,630

DEVICE FOR USE IN PACKAGING FOOD

Arnold John Thiede, Barrington, Ill.

Application July 24, 1947, Serial No. 763,189

2 Claims. (Cl. 226—129)

This invention relates to apparatus for use in packaging foods, and more particularly to apparatus adapted to be used in packaging foods in the home.

In recent years the practice of preserving food, particularly fruits and vegetables, by freezing has increased tremendously, and the advantages of preserving food by freezing are now available to millions of people through home freezers or neighborhood locker plants. When such foods are properly frozen, they may be stored for a long period of time, and when used they retain the bright color, fresh flavor and substantially all of the vitamin and mineral values of fresh foods.

Foods that are properly frozen may be stored for many months because organisms that cause spoilage are not active at the temperature at which such frozen foods are stored, which is preferably in the neighborhood of 0° F.

In freezing foods, particularly fruits and vegetables, it is essential, if good results are to be had, that proper methods be utilized to prepare and package the food. It is desirable, of course, that fruits or vegetables be prepared and frozen as quickly as possible after they are picked, but despite the desirability of freezing fruits and vegetables as quickly as possible, it is essential if good results are to be obtained that the foods be properly prepared and packaged.

After the necessary preparatory steps as washing, sorting, scalding, etc., have been taken, the food must be packaged as quickly as possible and in the proper manner in moisture-vapor-resistance packages that can be tightly sealed. If foods are not packaged properly, they dry out and lose flavor, appearance and vitamin value despite any amount of care and energy expended in the earlier preparation of such food. Many types of heat-sealed packages are satisfactory for use in packaging foods to be frozen. Among these are cartons with specially treated inner liners; and especially applicable for home use are ready-made bags of specially treated heat-sealing material. When bags of this type are used to form the package, an inner liner bag is used, this bag being made of material which may be sealed by running a warm iron over the folded edges after the food is placed therein. The inner liner bag is contained within an outer bag which may be made of cardboard or heavy paper, or the liner may be surrounded by a carton of mesh cloth commonly referred to as a "stockinette." The purpose of the outer portion of the package whether it comprises paper or cloth is to provide physical strength so the package may not easily be broken, while the purpose of the liner, of course, is to provide a seal around the food so that it will not dry out.

In the packaging of foods to be frozen, methods and apparatus which were formerly conventionally used in the home for canning are not desirable. Glass jars do not pack well in the freezer and may break in freezing. Furthermore, foods must be thawed before they can be removed from a glass jar. Tin cans are satisfactory for packaging fruits, but are not considered safe to be used for packing vegetables.

I have invented and am herewith disclosing and claiming apparatus for use in packaging foods, my apparatus being so designed that it greatly increases the efficiency and speed at which foods may be packaged in the home. Among other features, my apparatus provides a mandrel to facilitate the opening of the liner within which the foods are to be packaged, and to aid in assembling the liner and the outer portion of the package. In addition, my invention provides a support structure having openings wherein packages may be placed before being filled with food, this structure supporting each package so that it will not collapse or fall over. When the packages are filled with food, the top portion of the package may be folded over onto an adjacent surface and there may be heat-sealed with a conventional iron or other means without removing the package from the supporting structure. My invention also provides means whereby the mandrel which is advantageously used initially to open and assemble the package may be stored within the supporting structure, so that the entire apparatus may be stored or carried as a unit. As a further feature of my invention, I provide the mandrel with an air passage to facilitate opening the inner liner. Other features and advantages of my invention will be apparent from the following specification and from the drawings, in which:

Fig. 1 is a plan view of my improved apparatus with the mandrel stored within the support structure;

Fig. 2 is a section through the apparatus along the line 2—2 of Fig. 1;

Fig. 3 is a side view of the mandrel alone with a package inner liner placed thereon and the outer covering of said package partially placed thereon;

Fig. 4 is a transverse section through my improved apparatus along the line 4—4 of Fig. 1, but with the mandrel removed and with packages being supported in the openings provided therefor; and Fig. 5 is a plan view of the portion of the apparatus shown in section in Fig. 4.

Referring now to the drawings, a support structure designated generally at 10 comprises a base member 11, four upper side members 12a and four lower side members 12b, and a substantially horizontal member 13 which covers only a portion of the top of the support structure.

The support structure is divided into compartments by longitudinal partitions 14 and 15 which extend the entire length of the structure between the bottom member 11 and the lateral sides of the top member 13; and each of the longitudinal compartments thus formed along opposite sides of the structure are subdivided into three smaller compartments by means of partitioning members 16 and 17 on one side of the structure and 18 and 19 on the opposite side thereof. Another member 20, which is of substantially the same size as the top member 13, extends horizontally the length of the structure between two of the side members 12b to form another compartment beneath the member 13. The support structure is thus seen to have along one side thereof openings in the top leading into compartments designated respectively as A, B and C in Fig. 1, and along an opposite side thereof similar openings in the top leading into oppositely disposed but similar compartments D, E and F. The compartment G, which is beneath the top member 13 and extends the length of the support structure, is used to store a portion of my apparatus as will be hereafter described.

While any suitable dimensions might be used for the structure and the compartments contained therein, in one embodiment of my invention which I have constructed and which is designed for use in packaging foods in commonly available containers, the support structure has an inside width of approximately 10 inches, an inside length of approximately 14¼ inches, and a height of approximately 7 inches. Each of the similar compartments in the top of the container has an internal longitudinal dimension of approximately 4½ inches and an inside width of approximately 2½ inches, while the top member 13 has a width of approximately 5 inches, preferably being in the order of twice the width of said compartments.

As shown in Figures 1 and 2, a mandrel designated generally at 25 is stored in the storage compartment G. The mandrel comprises a base portion 26 and an elongated body portion extending at right angles from said base and being adapted to be inserted into a package for the purpose of opening the inner liner and outer covering of the package and for the purpose of facilitating the assembling of these two parts. An air passage designated at 28 extends through the body portion, said air passage communicating with the top of the body portion at 28a and communicating with a point on said body portion adjacent the base portion. As illustrated the air passage is T-shaped and communicates with oppositely disposed points 28b and 28c in the sides of the body portion adjacent the base 26.

A brief description of the operation of my improved apparatus will clearly bring out the manner in which it facilitates the proper packaging of foods. In Fig. 3, the mandrel 25 is shown as being removed from the storage compartment G and placed upon its base portion 26 with the elongated body portion 27 extending vertically. An inner package liner 29 is placed with its top end downwardly over the top of the mandrel and is moved down over the mandrel until its bottom rests upon the top of the mandrel. Air which is contained within the liner 29 is expelled through the air passage 28. An outer package member 30, which may be of cardboard, cloth mesh or other desirable material is then placed over the liner 29 and pulled down until the bottom of the outer covering contacts the bottom of the liner 29 and the members 29 and 30 are assembled to form a complete package.

The advantages of using the mandrel 25 to assemble the package in this manner will be apparent to those skilled in the art. The liner 29 is usually made of cellophane or a similar material, and said liner, when purchased, is collapsed. Since the cellophane has a tendency to stick together and is very easily torn, it has in the past been a difficult and time consuming operation to open the liner from its collapsed position to an expanded position wherein it forms a bag. After the liner has been opened, it is still necessary to insert it into the outer covering of the package, and this again, without the use of my mandrel has been a difficult and time consuming operation.

When the package is assembled, it is removed from the mandrel and placed in one of the compartments A—F in the support structure. In Figs. 4 and 5 assembled packages are shown in place in the compartments A and D. Reference to these figures and to Fig. 1 will show that the structure supports each package on four sides, so that it is impossible for the package to fall over and spill the food which has been placed therein. In Figs. 4 and 5 the package in the compartment D has been filled with food, which may be done by simply pouring the food into the open end of the package. When the package is filled, its top ends are folded over as shown in Fig. 4 onto the top member 13, said member forming a substantially horizontal surface adjacent and between the compartments for use in sealing the packages. The package in the compartment D may then be sealed by means of a warm iron or other conventional means without removing the package from the compartment. As shown in Figs. 4 and 5, since the surface formed by top member 13 is in the order of twice the width of each compartment and is adapted to support a conventional iron, empty packages may be placed in all of the compartments and each package may be filled; the open ends of all of the packages may then be folded over and all of the packages may be heat-sealed in one operation.

In using my apparatus, the six packages may be assembled and the structure may be fully loaded with these packages while the food is being scalded, chilled or undergoing other preparation. The six cartons may then be filled and sealed in a very short time, thus making for efficiency and a shortening of the time and labor required to prepare and package the food.

While I have shown and described one embodiment of my invention, it is to be understood that it is capable of many modifications. Changes, therefore, in the construction and arrangement may be made without departing from the spirit and scope of the invention as disclosed in the appended claims.

I claim:

1. Apparatus of the character described for use in packaging foods to be frozen, comprising: a rectangular base member; a pair of longitudinal partition members mounted on said base member in spaced parallel relationship and extending throughout substantially the entire length of said base, the respective partition members being equally spaced inwardly from two respective opposite sides of said base member and the distance between said partition members being substantially twice the distance from each of said members to the nearest side; a plurality of transverse partition members mounted on said base member, a spaced pair of said transverse members extending to each respective longitudinal partition member from the side of said base nearest each respective longitudinal member; a plurality of side members extending around the periphery of said base member, said side members, longitudinal partitions and transverse partitions forming a plurality of compartments adjacent each of two respective opposite sides of said base, each of said compartments being adapted to receive a package and each compartment being adapted to support said package on four sides; a top member extending between said longitudinal members throughout substantially their entire length for providing a substantially horizontal surface between said longitudinal members and adjacent said compartment for use in heat sealing each package without removing it from said compartment; and an intermediate member extending between said longitudinal members for providing a horizontal surface between said top member and said base.

2. Apparatus of the character described for use in packaging foods to be frozen, comprising: a base member; a pair of longitudinal partition members mounted on said base member in spaced parallel relationship and extending throughout substantially the entire length of said base, the respective partition members being equally spaced inwardly from two respective opposite sides of said base member and the distance between said partition members being substantially twice the distance from each of said members to the nearest side; a plurality of transverse partition members mounted on said base member, at least one of said transverse members extending to each respective longitudinal partition member from the side of said base nearest each respective longitudinal member; a plurality of side members extending around the periphery of said base member, said side members, longitudinal partitions and transverse partitions forming a plurality of compartments adjacent each of two respective opposite sides of said base, each of said compartments being adapted to receive a package and each compartment being adapted to support said package on four sides; a top member providing a substantially horizontal surface between said sides; and a horizontal intermediate member extending between said longitudinal members intermediate said base and top members providing a compartment adapted to receive a mandrel.

ARNOLD JOHN THIEDE.

REFERENCES CITED

The following references are of record in the file of this patent:

UNITED STATES PATENTS

| Number | Name | Date |
|---|---|---|
| 786,077 | Wehmeier et al. | Mar. 28, 1905 |
| 1,933,894 | Clink | Nov. 7, 1933 |
| 2,052,726 | Schleier | Sept. 1, 1936 |
| 2,087,435 | Hubbert | July 20, 1937 |
| 2,135,132 | Boehmek | Nov. 1, 1938 |
| 2,161,071 | McGrath et al. | June 6, 1939 |